H. A. Alden,

Hose.

No. 100,096. Patented Feb. 22. 1870.

Inventor:
Henry A. Alden by
A. Pollok
his atty

WITNESSES.
M. Bailey

United States Patent Office.

HENRY A. ALDEN, OF MATTEAWAN, NEW YORK, ASSIGNOR TO THE NEW YORK RUBBER COMPANY.

Letters Patent No. 100,096, dated February 22, 1870.

IMPROVEMENT IN VULCANIZED RUBBER HOSE.

The Schedule referred to in these Letters Patent and making part of the same.

*To all whom it may concern:*

Be it known that I, HENRY A. ALDEN, of Matteawan, in the county of Dutchess, and State of New York, have invented certain new and useful Improvements in Vulcanized India-Rubber Hose; and I do hereby declare the following to be a full, clear, and exact description of the same, reference being had to the accompanying drawings, in which—

Figure 1:
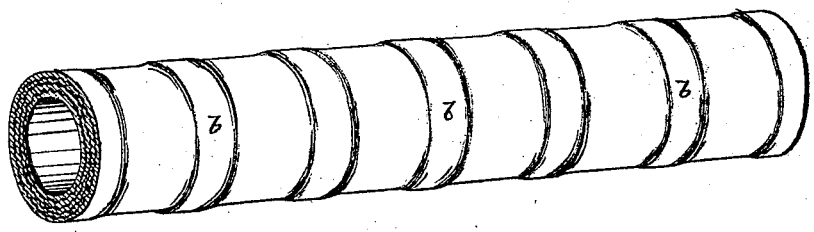
Figure 1 is a side elevation of a portion of hose made in accordance with my invention.
Figure 2:
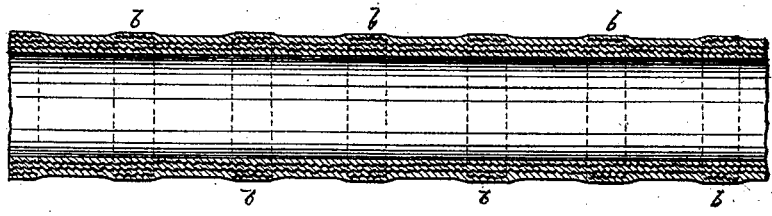
Figure 2 is a longitudinal central section of the same.
Figure 3:
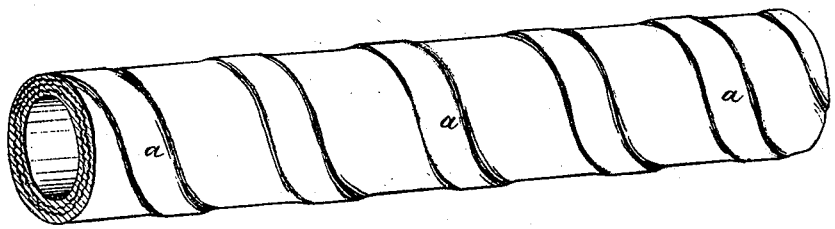
Figures 3 and 4 are like views of a modified form of the hose.
Figure 4:
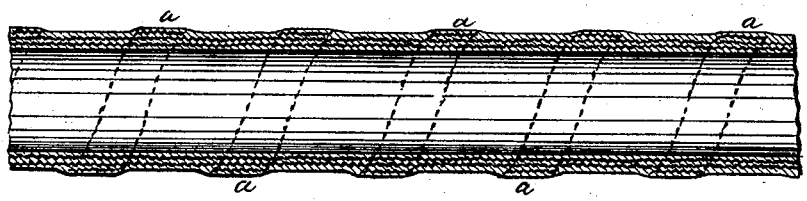

My invention relates to vulcanized rubber hose, the body of which is composed of alternate plies of canvas and layers of India rubber, formed into the required shape upon a mandrel, and then vulcanized in the manner well known to those skilled in the art to which this invention pertains.

Usually, it is the practice to wind the plies, either spirally or otherwise, so that the canvas shall be in continuous sheets or layers, this being considered necessary in order to obtain hose of the requisite strength.

I have, however, in the manufacture of such hose, discovered by continued and careful experiment that more canvas is consumed than is necessary, and that one or more of the plies or layers of canvas may be reduced, without detracting from the strength of the hose.

For instance, in hose having three plies of canvas, as represented in the drawings, I lessen the quantity of canvas ordinarily employed in its manufacture by making the inner two plies in the usual way, and then employing, in lieu of the outer continuous ply, a band or ribbon of canvas, wound either spirally, as shown at *a*, or arranged in rings, as seen at *b*, there being a considerable space between the folds of the spiral or the rings, so as to reduce very considerably the quantity of canvas employed in this ply.

Repeated experiment has demonstrated that hose thus made equals in strength ordinary three-ply hose, while, owing to the reduction in the quantity of the canvas, a lighter and cheaper article is produced.

The space between the rings *b* or the folds of the spiral *a* can be greater or lesser than shown in the drawing, this being discretionary with the manufacturer; and this arrangement is not limited to the outer ply, for any one of the layers of canvas may be thus formed; and further, two or more of the canvas layers can be arranged as described, this being determined by the size of the hose, the number of plies entering into its composition, and the use for which it is designed.

If two spirals are used, they should be wound or coiled in opposite directions, so as to cross each other in the manner of lattice-work, so as to leave diamond-shaped spaces between the spirals.

The canvas band or ribbon may be arranged spirally or in rings, or wound in any other equivalent manner.

Having described my invention, and the manner in which the same is or may be carried into effect,

What I claim, and desire to secure by Letters Patent, is—

As a new manufacture, hose composed of vulcanized India rubber and canvas, or equivalent material, as described, having one or more of the canvas plies formed of a band or ribbon wound spirally, or arranged in rings, or in an equivalent manner, so as to leave intervals between the rings or between the folds of the spiral, as and for the purposes set forth.

In testimony whereof, I have signed my name to this specification before two subscribing witnesses.

HENRY A. ALDEN.

Witnesses:
P. F. BARNUM, Jr.,
C. F. BRONN.